(12) United States Patent
Dry et al.

(10) Patent No.: US 10,232,815 B1
(45) Date of Patent: Mar. 19, 2019

(54) SEAT ASSEMBLY

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/786,836

(22) Filed: Oct. 18, 2017

(51) Int. Cl.
| | |
|---|---|
| *B60N 2/24* | (2006.01) |
| *B60N 2/42* | (2006.01) |
| *B60N 2/427* | (2006.01) |
| *A47B 83/02* | (2006.01) |
| *B60R 21/18* | (2006.01) |
| *B60N 3/00* | (2006.01) |
| *B60R 21/233* | (2006.01) |
| *B60R 21/207* | (2006.01) |
| *B60R 21/231* | (2011.01) |
| *B60R 21/02* | (2006.01) |

(52) U.S. Cl.
CPC .............. *B60R 21/18* (2013.01); *B60N 3/001* (2013.01); *B60R 21/207* (2013.01); *B60R 21/233* (2013.01); *B60R 2021/022* (2013.01); *B60R 2021/23107* (2013.01); *B60R 2021/23169* (2013.01)

(58) Field of Classification Search
CPC ..... B60R 21/18; B60R 21/233; B60R 21/207; B60N 3/001

USPC ....................... 297/145, 162, 392, 393, 216.1
See application file for complete search history.

(56) References Cited

U.S. PATENT DOCUMENTS

| | | | | |
|---|---|---|---|---|
| 2,845,113 A | * | 7/1958 | Keel ......................... | A47C 7/70 297/145 |
| 2,947,348 A | * | 8/1960 | Peckham .................. | A47C 7/70 297/145 |
| 3,298,735 A | * | 1/1967 | Berman .................... | A47C 7/70 297/145 |
| 3,315,282 A | * | 4/1967 | Lowery ................ | A47G 9/1054 297/392 X |
| 3,583,760 A | * | 6/1971 | McGregor ............. | A47B 5/006 297/145 |
| 3,632,161 A | * | 1/1972 | Arfaras .................... | A47C 7/70 297/145 |

(Continued)

FOREIGN PATENT DOCUMENTS

| | | |
|---|---|---|
| DE | 4131998 A1 | 3/1993 |
| DE | 102007052975 A1 | 5/2009 |

(Continued)

*Primary Examiner* — Rodney B White
(74) *Attorney, Agent, or Firm* — Frank A. MacKenzie; Bejin Bieneman PLC

(57) ABSTRACT

A seat assembly includes a first bolster and a second bolster spaced from each other. The seat assembly includes a seat bottom between the first and second bolster. The seat assembly includes a bridge deployable to a deployed position. The bridge in the deployed position is spaced from the seat bottom. The bridge in the deployed position is supported on the first and second bolsters and extends from the first bolster to the second bolster. The seat assembly includes an inflatable device supported by the bridge.

21 Claims, 10 Drawing Sheets

(56) References Cited

U.S. PATENT DOCUMENTS

| | | | | |
|---|---|---|---|---|
| 3,650,223 A * | 3/1972 | Kobori | A47B 31/06 | 108/44 |
| 3,975,037 A * | 8/1976 | Hontschik | B60N 2/2839 | 280/733 |
| 3,985,374 A * | 10/1976 | Powaska | B60N 3/004 | 248/240.4 |
| 4,235,472 A * | 11/1980 | Sparks | A45C 9/00 | 297/392 X |
| 4,413,838 A * | 11/1983 | Varterasian | B60R 21/02 | 280/751 |
| 4,565,535 A * | 1/1986 | Tassy | B60R 21/16 | 244/121 |
| 4,834,420 A * | 5/1989 | Sankrithi | A01K 1/0272 | 280/728.1 |
| 4,944,552 A * | 7/1990 | Harris | A47C 7/70 | 297/145 |
| 5,050,929 A * | 9/1991 | Gueringer | A47C 7/70 | 297/145 |
| 5,062,662 A * | 11/1991 | Cameron | B60R 21/18 | 280/733 |
| 5,193,765 A * | 3/1993 | Simpson | B64D 11/0693 | 297/145 X |
| 5,375,908 A * | 12/1994 | Goor | B60R 21/01 | 297/216.11 |
| 5,390,952 A * | 2/1995 | Goor | B60R 21/01 | 280/730.1 |
| 5,511,850 A * | 4/1996 | Coursey | B60N 2/2839 | 280/730.1 |
| 5,577,765 A | 11/1996 | Takeda et al. | | |
| 5,611,601 A * | 3/1997 | Cowgur | A47C 7/383 | 297/393 |
| 5,645,319 A * | 7/1997 | Parks, Jr. | A47C 7/383 | 297/392 X |
| 5,653,501 A * | 8/1997 | Goor | B60N 2/2839 | 297/216.11 |
| 5,655,817 A * | 8/1997 | Nienow | B60N 2/2839 | 297/216.11 |
| 5,711,574 A * | 1/1998 | Barnes | B60N 2/002 | 297/216.11 |
| 5,743,554 A * | 4/1998 | Friedrich | B60R 21/02 | 280/730.1 |
| 5,871,230 A | 2/1999 | Lewis | | |
| 5,927,799 A * | 7/1999 | Tornero | A47C 7/70 | 297/145 |
| 6,042,185 A * | 3/2000 | Cowgur | A47C 7/383 | 297/393 |
| 6,431,586 B1 | 8/2002 | Eyrainer et al. | | |
| 6,434,770 B2 * | 8/2002 | Matthews Brown | A47C 7/383 | 297/393 |
| 6,647,573 B2 * | 11/2003 | Corbin | A47C 16/00 | 297/391 |
| 6,721,978 B1 * | 4/2004 | Tankersley | B60N 2/882 | 297/392 X |
| 6,736,455 B1 | 5/2004 | Zakovic et al. | | |
| 6,957,462 B1 * | 10/2005 | Wilcox | A47C 7/383 | 297/393 |
| 6,973,691 B1 * | 12/2005 | Cordova | A47C 7/383 | 297/392 X |
| 7,070,201 B2 | 7/2006 | Song et al. | | |
| 7,311,354 B2 * | 12/2007 | Giasson | B64D 11/06 | 297/145 |
| 7,627,916 B1 * | 12/2009 | Gielow | A47C 16/00 | 297/393 |
| 7,798,072 B2 * | 9/2010 | Becker | B60N 3/002 | 297/145 X |
| 7,874,614 B2 * | 1/2011 | Figueras Mitjans | A47C 7/70 | 297/145 |
| 7,909,406 B2 * | 3/2011 | Samuelsen | A47C 7/383 | 297/392 |
| 7,992,502 B1 | 8/2011 | Davis | | |
| 8,336,956 B2 * | 12/2012 | Westerink | B64D 11/06 | 297/145 X |
| 8,528,978 B2 * | 9/2013 | Purpura | B64D 11/06 | 297/392 X |
| 8,789,847 B2 | 7/2014 | Nagasawa et al. | | |
| 8,985,693 B2 * | 3/2015 | Purpura | A45F 4/06 | 297/392 X |
| 9,616,747 B1 * | 4/2017 | Breed | B60K 31/0058 | |
| 9,993,084 B2 * | 6/2018 | Trucco | A47C 7/383 | |
| 2004/0026979 A1 * | 2/2004 | Haddon | A47C 16/00 | 297/393 |
| 2008/0054602 A1 | 3/2008 | Yang | | |
| 2013/0341975 A1 * | 12/2013 | Schneider | B64D 11/06 | 297/163 |
| 2017/0225788 A1 * | 8/2017 | Humbert | B60R 21/18 | |
| 2018/0272977 A1 * | 9/2018 | Szawarski | B60R 21/01512 | |

FOREIGN PATENT DOCUMENTS

| | | |
|---|---|---|
| DE | 102011016583 A1 | 10/2012 |
| EP | 1632407 A2 | 3/2006 |
| GB | 1314608 A | 4/1973 |

* cited by examiner

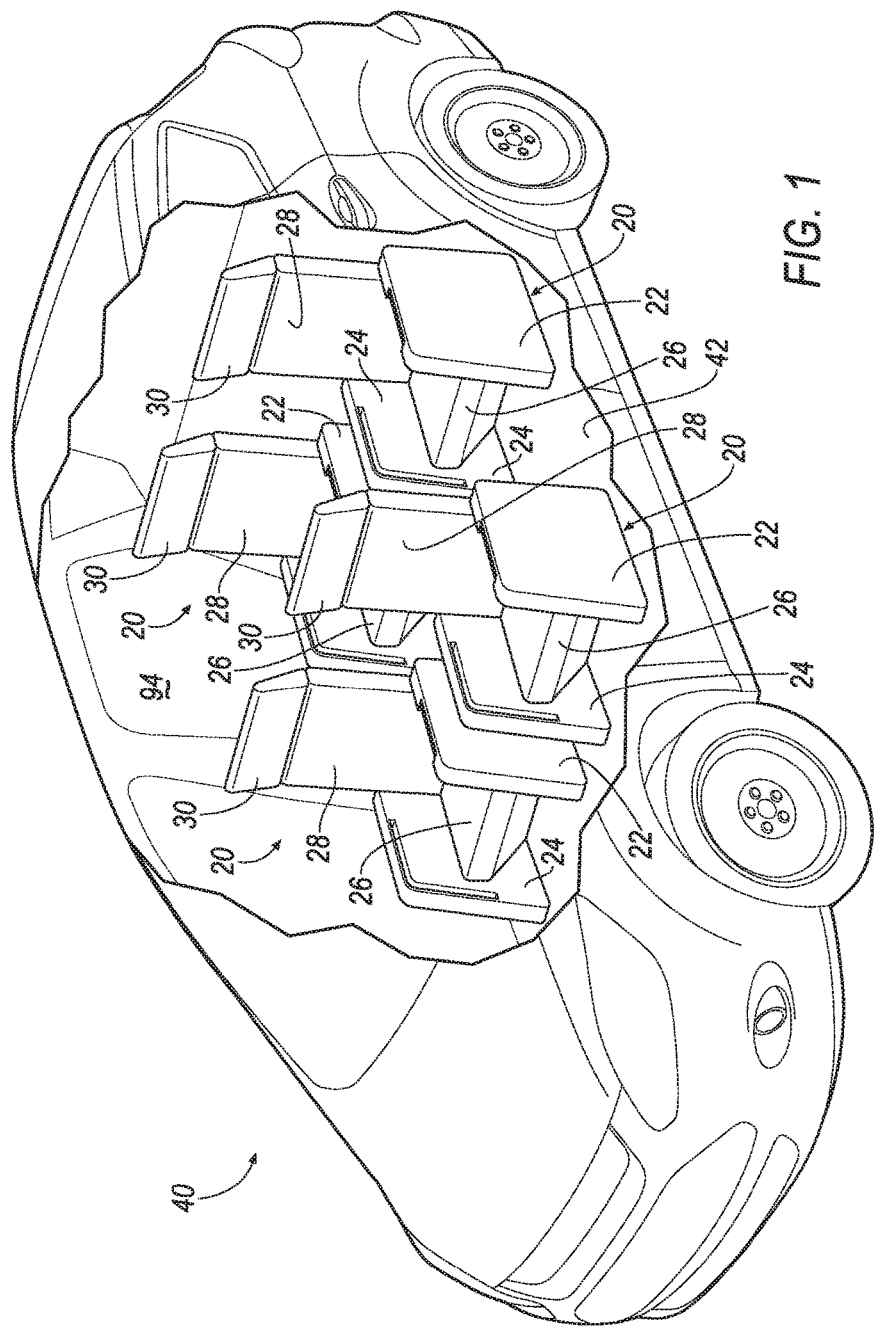

SEAT ASSEMBLY

BACKGROUND

A vehicle may include a restraint system to restrain seat occupants during a vehicle impact event. The restraint system may be, for example, a seat belt system, an airbag system, or any other suitable restraint system. Some vehicles may include a variety of different restraint systems that operate conjunctively with one another, or separately from one another.

BRIEF DESCRIPTION OF THE DRAWINGS

FIG. 1 is a cut-away perspective view of a vehicle including four seat assemblies.

DETAILED DESCRIPTION

Figure 2A:
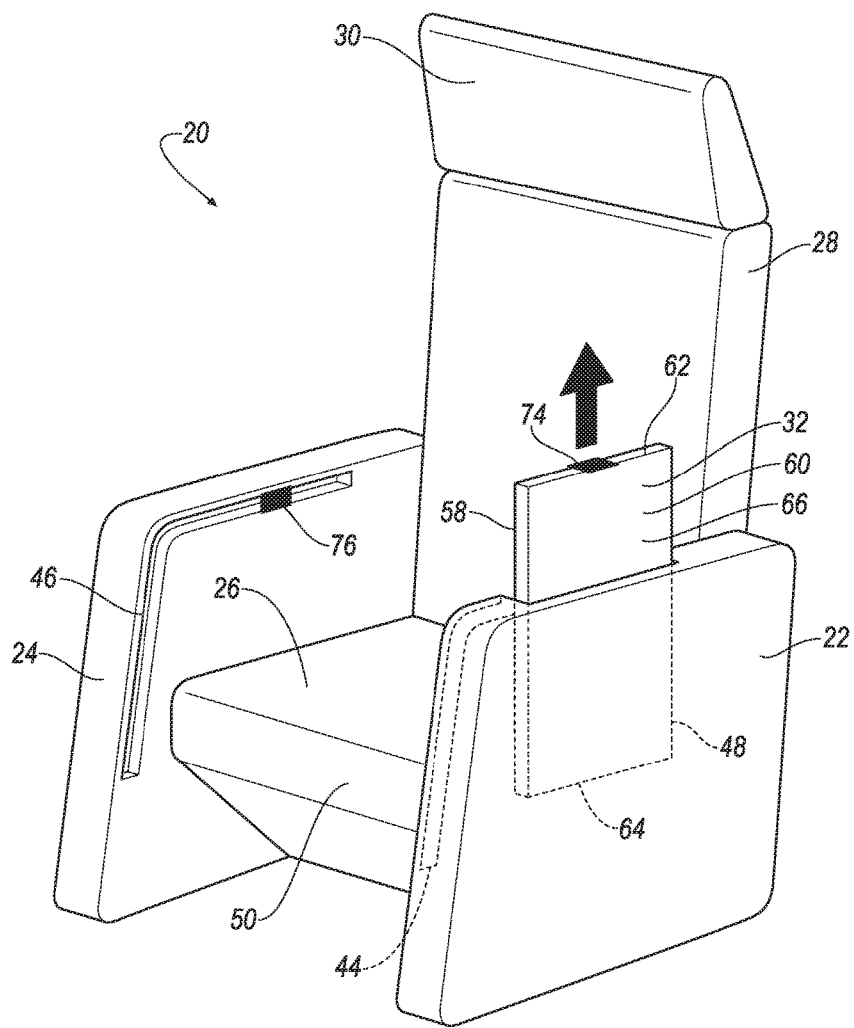
FIG. 2A is a perspective view of one of the seat assemblies during an early stage of a deployment of a bridge.

A seat assembly includes a first bolster and a second bolster spaced from each other. The seat assembly includes a seat bottom between the first and second bolster. The seat assembly includes a bridge deployable to a deployed position. The bridge in the deployed position is spaced from the seat bottom. The bridge in the deployed position is supported on the first and second bolsters and extends from the first bolster to the second bolster. The seat assembly includes an inflatable device supported by the bridge.

The bridge may be rotatable relative to the first bolster between an undeployed position and the deployed position. In the deployed position, the bridge may be releasably locked to the second bolster.

The first bolster may include a slot, and the bridge in the undeployed position may be stowed in the slot.

During a deployment of the bridge to the deployed position, the bridge may be designed to be extracted from the slot and moved toward the second bolster.

The inflatable device may be inflatable from the bridge in a direction away from the seat bottom.

The seat assembly may include a second inflatable device supported by the bridge. The second inflatable device may be inflatable toward the seat bottom.

The seat assembly may include a knee restraint supported by the bridge. The knee restraint may be deployable to a deployed position. The knee restraint in the deployed position may be in front of the seat bottom.

The knee restraint may be rolled into the bridge. During a deployment of the knee restraint, the knee restraint may be designed to unroll to the deployed position.

During a deployment of the knee restraint, the knee restraint may be designed to inflate to an inflated position.

The first bolster may include a first track and the second bolster may include a second track. The first track and the second track may face each other.

The bridge may be engageable with the first and second tracks and lockable with the second track.

The seat assembly may include a knee restraint supported by the bridge. The knee restraint may be engageable with the first and second tracks and deployable along the first and second tracks.

The bridge may include a cavity, and the inflatable device in an uninflated position may be housed in the cavity.

The seat assembly may include a second inflatable device and a knee restraint. The second inflatable device and the knee restraint may be housed in the cavity.

The seat bottom may extend from the first bolster to the second bolster.

The bridge may include a base and a lid having a first end rotatably attached to the base and a second end removably attached to the base.

During an inflation of the inflatable device, the lid may be designed to rotate and stop at a predetermined location and the inflatable device in an inflated position may abut the lid at the predetermined location.

The seat assembly may include a seat back supported by the seat bottom. The bridge in the deployed position may be spaced from the seat back.

The bridge may be rigid relative to the inflatable device.

The bridge may have a first end and a second end spaced from the first end. The first end may include a locking mechanism and the second end may include a rotating mechanism.

With reference to the Figures, wherein like numerals indicate like parts throughout the several views, a seat assembly 20 is generally shown. The seat assembly 20 includes a first bolster 22 and a second bolster 24 spaced from each other. The seat assembly 20 includes a seat bottom 26 between the first and second bolster 22, 24. The seat assembly 20 includes a bridge 32 deployable to a deployed position. The bridge 32 in the deployed position is spaced from the seat bottom 26. The bridge 32 in the deployed position is supported on the first and second bolsters 22, 24 and extends from the first bolster 22 to the second bolster 24. The seat assembly 20 includes an inflatable device 34 supported by the bridge 32.

The seat assembly 20 may replace the need for other restraint systems in the vehicle such as, for example, seat belt systems on the seat assembly 20 and/or other airbag systems. By being supported by the bridge 32, the inflatable device 34 may be positioned to receive a seat occupant and restrict movement of the seat occupant during a vehicle impact.

With reference to FIG. 1, a vehicle 40 is generally shown. The vehicle 40 may be, for example, an autonomous vehicle. For example, the vehicle 40 may include a computer that controls operations of the vehicle in an autonomous mode, a semi-autonomous mode, and/or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 40 may include a passenger cabin 94 to house occupants, if any, of the vehicle 40. The passenger cabin 94 may include any suitable arrangement of one or more seat assemblies 20. As an example, the passenger cabin 94 may include a front row of one or more of the seat assemblies 20 disposed at a front of the passenger cabin 94 and a back row of one or more of the seat assemblies 20 disposed behind the front row. The passenger cabin 94 may also include third-row seats (not shown) at a rear of the passenger cabin 94. In FIG. 1, there are four seat assemblies 20 shown, however, the vehicle 40 may include any suitable number of seat assemblies 20 in any suitable position and orientation.

The vehicle 40 may include a floor 42. The seat assemblies 20 may be supported on the floor 42. The seat assemblies 20 may be rotatable relative to the floor 42, e.g., the seat assemblies 20 may be rotatably supported on the floor 42. For example, the seat assemblies 20 may face in a vehicle-forward direction as shown in FIG. 1, or the seat assemblies 20 may face in any suitable direction, such as a vehicle-rearward direction, a cross-vehicle direction, etc. Alternatively, the seat assemblies 20 may be fixed to the floor 42, i.e., not rotatable relative to the floor 42.

Figure 2B:
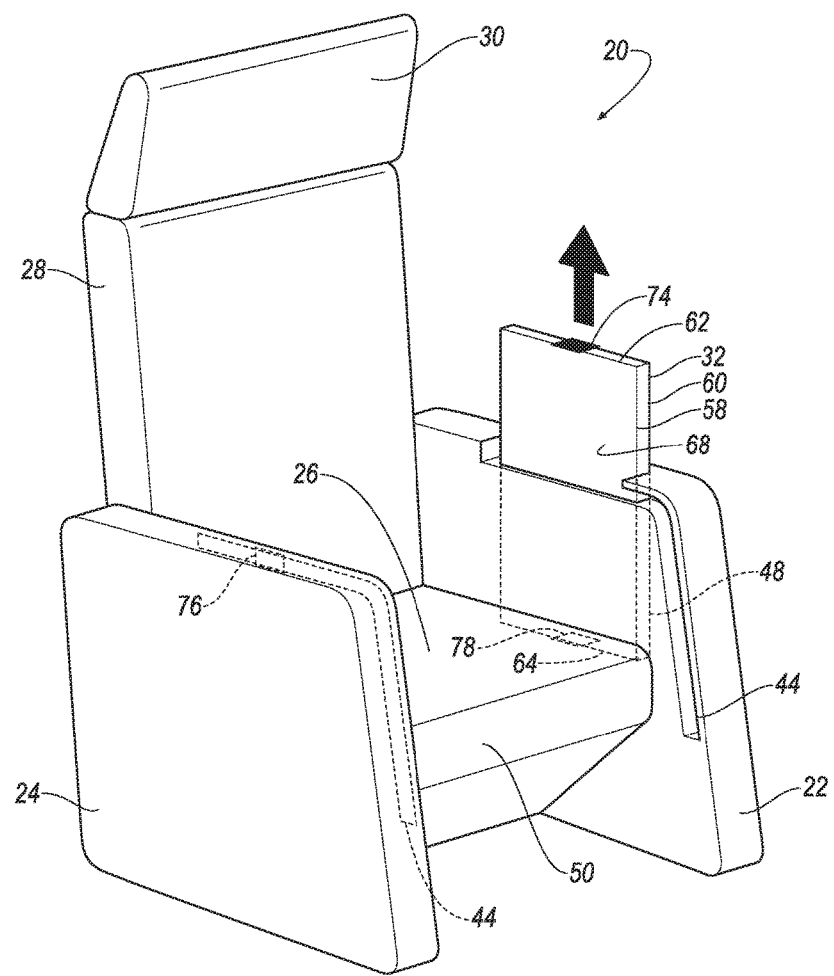
FIG. 2B is a perspective view of the seat assembly during the early stage of the deployment of the bridge.
Figure 3:
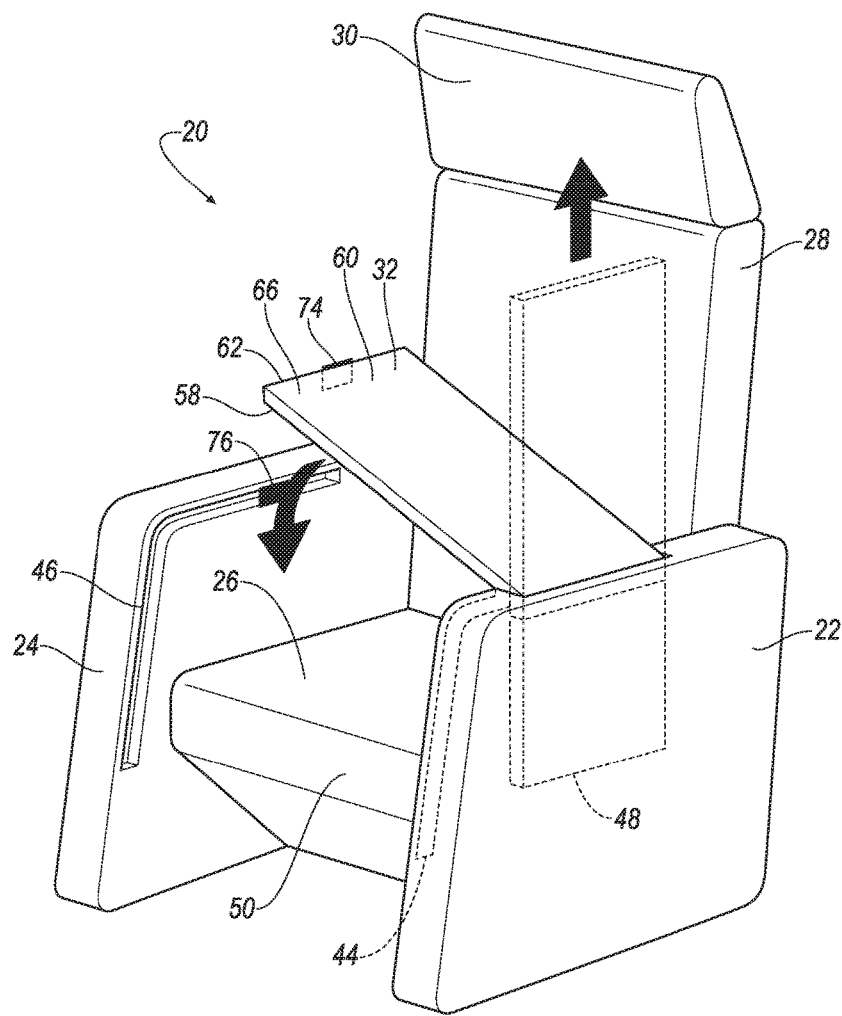
FIG. 3 is a perspective view of the seat assembly during a later stage of the deployment of the bridge.

With reference to FIGS. 2A-3, the seat assembly 20 may include a seat back 28, the seat bottom 26, a head restraint 30, and the first and second bolsters 22, 24. The head restraint 30 may be supported by the seat back 28 and may be stationary or movable relative to the seat back 28. The seat back 28 may be supported by the seat bottom 26 and may be stationary or movable relative to the seat bottom 26. The seat back 28, the seat bottom 26, and/or the head restraint 30 may be adjustable in multiple degrees of freedom. Specifically, the seat back 28, the seat bottom 26, and/or the head restraint 30 may themselves be adjustable, in other words, adjustable components within the seat back 28, the seat bottom 26, and/or the head restraint 30, and/or may be adjustable relative to each other.

The seat assembly 20 may include at least one frame (not shown). For example, the seat bottom 26, the seat back 28, the head restraint 30, and/or the first and second bolsters 22, 24 may include a frame (not shown). The seat assembly 20 may include a covering (not numbered) supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be formed of cloth, leather, faux leather, or any other suitable material. The upholstery may be stitched in panels around the frame. The padding may be between the covering and the frame, and may be formed of foam or any other suitable material.

With continued reference to FIGS. 2A-3, the first and second bolsters 22, 24 may be spaced from each other on opposite sides of the seat bottom 26. For example, the seat bottom 26 may extend from the first bolster 22 to the second bolster 24, i.e., may contact both the first and second bolsters 22, 24. As another example, the seat bottom 26 may be coupled to the first and second bolsters 22, 24 through an intermediate component. Alternatively, the first and second bolsters 22, 24 may be spaced from the seat bottom 26 on opposite sides of the seat bottom 26.

The first and second bolsters 22, 24 may be spaced from each other on opposite sides of the seat back 28. For example, the seat back 28 may extend from the first bolster 22 to the second bolster 24, i.e., may contact both the first and second bolsters 22, 24. As another example, the seat back 28 may be coupled to the first and second bolsters 22, 24 through an intermediate component. Alternatively, the first and second bolsters 22, 24 may be spaced from the seat back 28 on opposite sides of the seat back 28.

The first and second bolsters 22, 24 may have shapes and sizes that are substantially similar or identical to each other, or the first and second bolsters 22, 24 may have shapes and sizes that are different from each other. For example, the first and second bolsters 22, 24 are shown as having generally rectangular cross-sections, however, the first and second bolsters 22, 24 may have any suitable cross-section.

The first and second bolsters 22, 24 may be separate and distinct from the seat bottom 26 and/or the seat back 28. Alternatively, the first and second bolsters 22, 24 may be integral with the seat bottom 26 and/or the seat back 28, i.e., the first and second bolsters 22, 24 and the seat bottom 26 and/or the seat back 28 may be one, singular component. The first and second bolsters 22, 24 may be incorporated into other features of the vehicle 40, such as, the floor 42, an A-pillar, a B-pillar, a C-pillar, a door, an armrest, a center console, etc.

The first bolster 22 may include a first track 44 and the second bolster 24 may include a second track 46. The first track 44 and the second track 46 may face each other. That is, the first track 44 may be on a surface of the first bolster 22 generally facing the seat bottom 26, and the second track 46 may be on a surface of the second bolster 24 generally facing the seat bottom 26. The first track 44 and the second track 46 may have attributes, such as, length, width, depth, shape, positioning, etc., that are substantially similar or identical to each other. Alternatively, the first track 44 and the second track 46 may have attributes, such as, length, width, depth, shape, positioning, etc., that are different from each other.

With reference to FIGS. 1-3, the first bolster 22 may include a slot 48, and the bridge 32 in an undeployed position may be stowed in the slot 48, as shown in FIG. 1. For example, the slot 48 may be defined by the first bolster 22 and may have a shape and size slightly larger than the shape and size of the bridge 32. The bridge 32 may be slidably engaged with the slot 48, i.e., the bridge 32 may be movable relative to the slot 48 and the first bolster 22. For example, the first bolster 22 may include a track (not shown) or any other suitable mechanism along the slot 48, and the bridge 32 may be slidably engaged with the track or other suitable mechanism.

The bridge 32 may be deployable from the undeployed position, as shown in FIG. 1, to the deployed position, as shown in FIGS. 4-6, 8, and 9. As set forth above, in the undeployed position, the bridge 32 may be stowed in the slot 48. In the deployed position, the bridge 32 may be extended from the first bolster 22 to the second bolster 24, and the bridge 32 may be releasably locked to the second bolster 24. For example, the bridge 32 may have a first end 62 and a second end 64 spaced from the first end 62. The first end 62 may include a locking mechanism 74, and the second bolster 24 may include a second locking mechanism 76. The locking mechanism 74 and the second locking mechanism 76 may be designed to engage and lock with each other in the deployed position. For example, the locking mechanism 74 may be a male locking mechanism and the second locking mechanism 76 may be a female locking mechanism designed to receive the locking mechanism 74. Alternatively, the second locking mechanism 76 may be a male locking mechanism and the locking mechanism 74 may be a female locking mechanism designed to receive the second locking mechanism 76. The locking mechanism 74 and the second locking mechanism 76 may be of any suitable type and may include magnets, electromagnets, spring-loaded latches, slide bolts, draw latches, etc.

The bridge 32 may be rotatable relative to the first bolster 22 between the undeployed position and the deployed position, as shown by FIGS. 2A-4. Specifically, when the bridge 32 is retracted in the slot 48, the slot 48 prevents rotation of the bridge 32 relative to the first bolster 22, and when extended from the slot 48, as shown in FIG. 3, the bridge 32 may rotate relative to the first bolster 22. For example, the second end 64 of the bridge 32 may include a rotating mechanism 78. The rotating mechanism 78 may be, for example, a hinge, or any suitable rotating mechanism.

As one example, the bridge 32 may be manually extended/retracted from the slot 48 and rotatable relative to the first bolster 22. Alternatively, or additionally, the bridge may be automatically extended/retracted and rotatable relative to the first bolster 22, e.g., with the use of motors.

Figure 4:
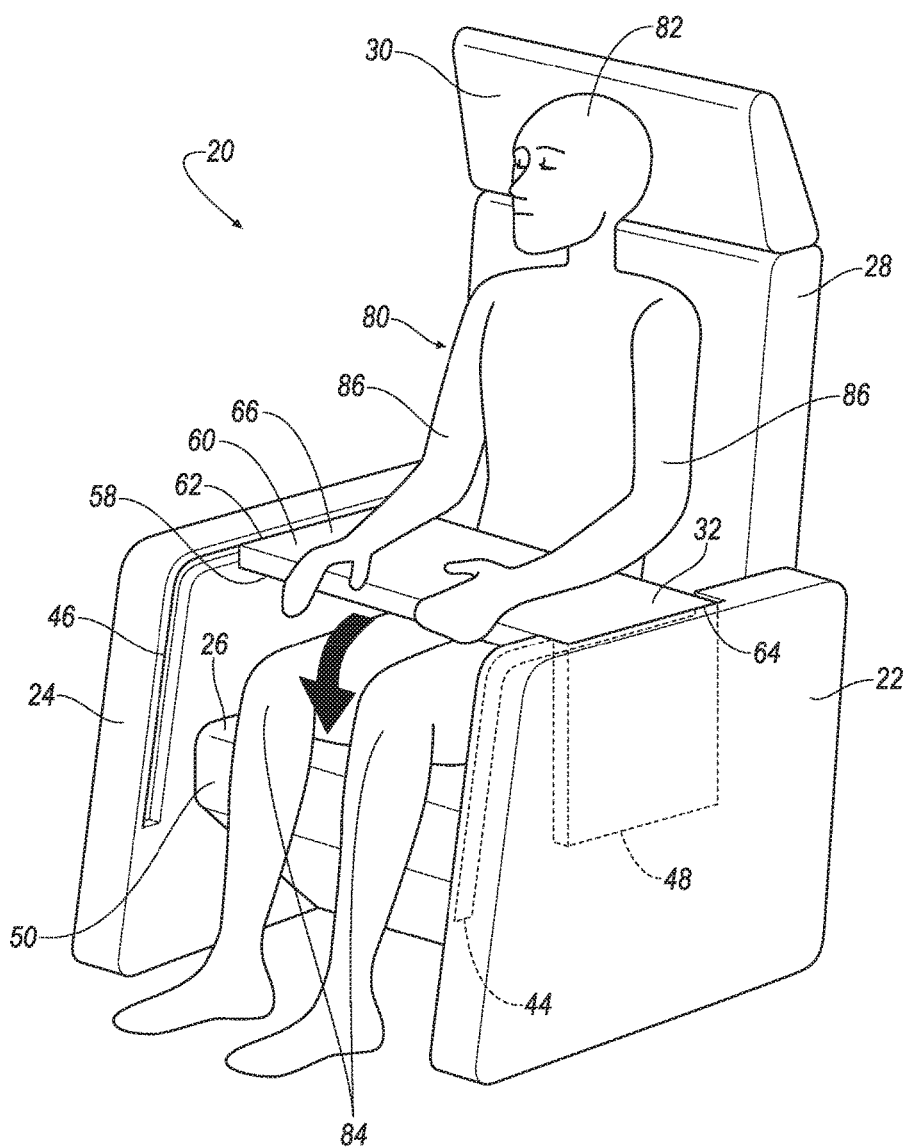
FIG. 4 is a perspective view of the seat assembly with an occupant and with the bridge in a deployed position.

With reference to FIG. 4, in the deployed position, the bridge 32 may be engageable with the first and second tracks 44, 46 and lockable with the second track 46. For example, the second track 46 may include the second locking mechanism 76 designed to engage and lock with the locking mechanism 74. The first and second tracks 44, 46 may be configured to receive the bridge 32, i.e., the first and second tracks 44, 46 may have a height slightly larger than a height of the bridge 32, and the bridge 32 may be designed to engage with the first and second tracks 44, 46.

With reference to FIGS. 2A-4, the bridge 32 may include a top surface 66 and a bottom surface 68 opposite the top surface 66. In the deployed position, the bottom surface 68 may face generally toward the seat bottom 26 and the top surface 66 may face generally away from the seat bottom 26. The top and bottom surfaces 66, 68 may be generally flat and the top surface 66 may receive a variety of items, such as, laptop computers, notebooks, arms 86 of an occupant 80, etc. Alternatively, the top and bottom surfaces 66, 68 may be configured in any suitable way.

With reference to FIG. 4, the bridge 32 in the deployed position may be spaced from the seat bottom 26, and the bridge 32 in the deployed position may be spaced from the seat back 28. The occupant 80 may be seated in the seat assembly 20. The occupant 80 may be between the bridge 32 and the seat bottom 26, and the occupant 80 may be between the bridge 32 and the seat back 28.

Figure 5:
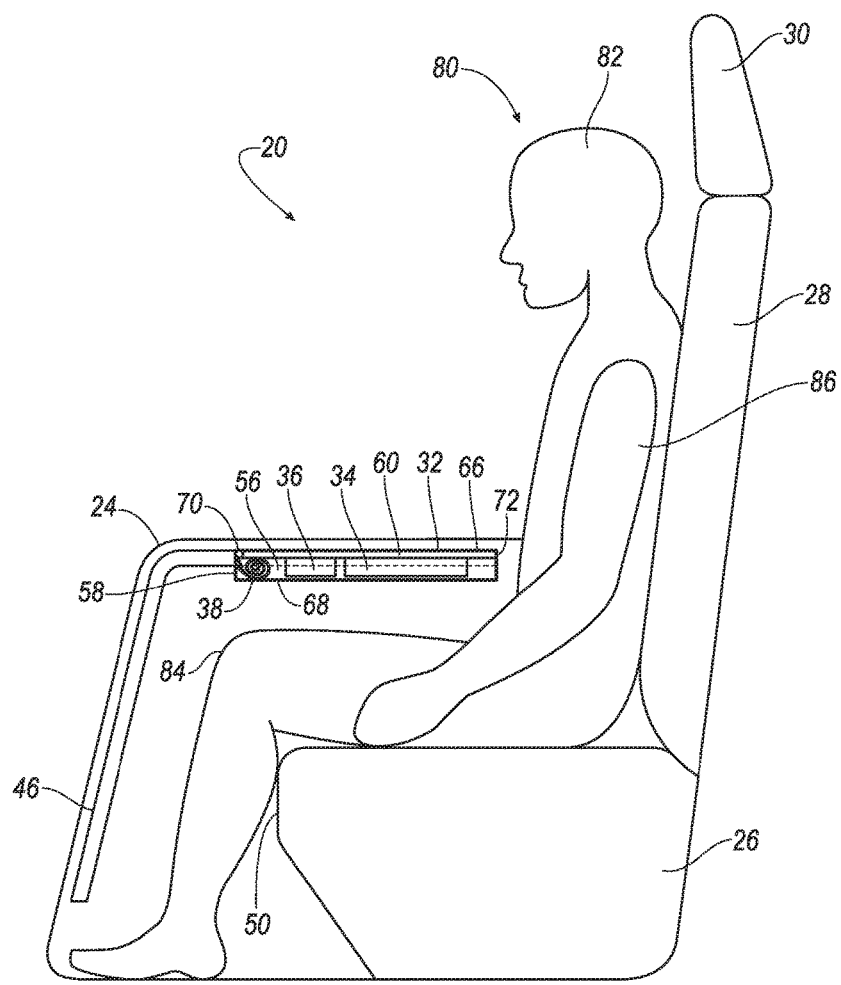
FIG. 5 is a cross-section view of a portion of FIG. 4.
Figure 8:
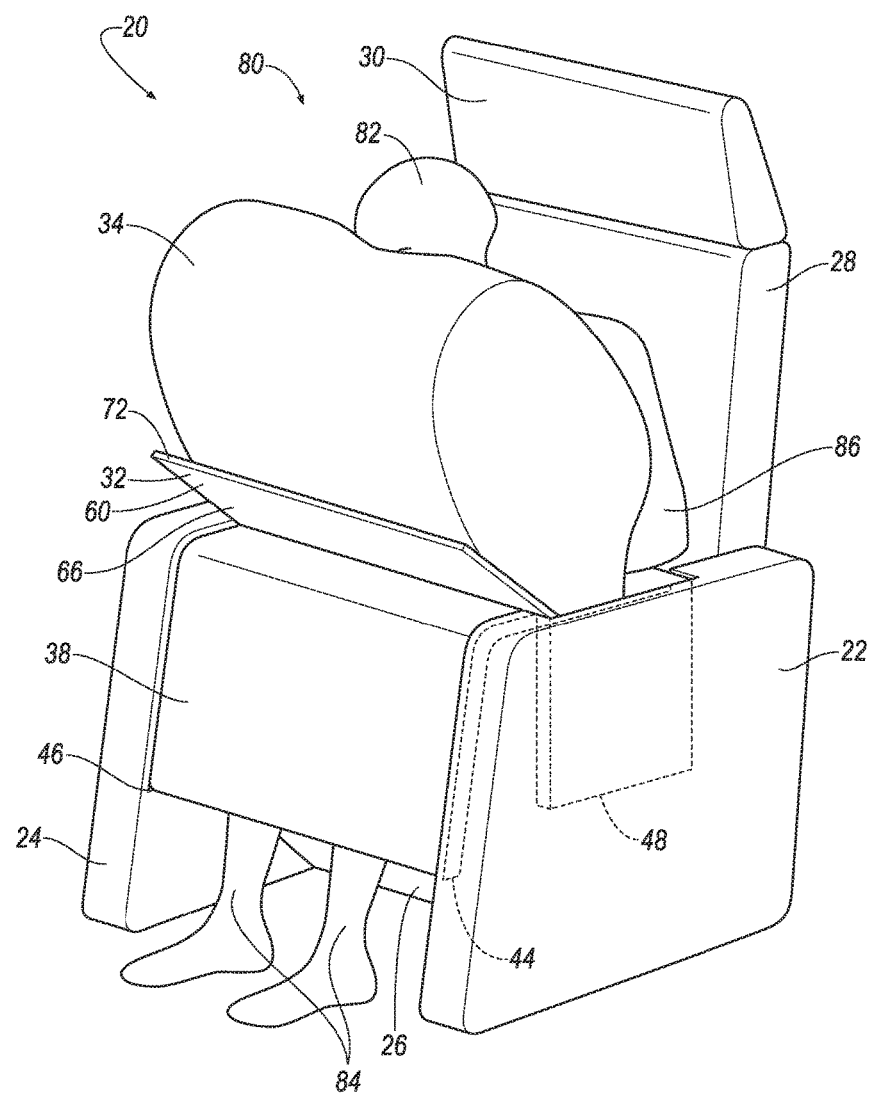
FIG. 8 is a perspective view of the seat assembly with the knee restraint in the deployed position and an inflatable device in an inflated position, during a vehicle impact.

With reference to FIGS. 4, 5, and 8, the bridge 32 may include a base 58 and a lid 60. The lid 60 may have a first end 70 rotatably attached to the base 58 and a second end 72 removably attached to the base 58. For example, the first end 70 may be rotatably attached to the base 58 via a hinge or any suitable rotatable mechanism, and the second end 72 may be removably attached to the base 58 via any suitable mechanism, such as, a tear seam, a latch, magnets, etc.

With reference to FIG. 5, the bridge 32 may include a cavity 56. The cavity 56 may be defined by the base 58 and the lid 60. For example, the cavity 56 may be filled with any suitable material, such as, foam, cloth, etc., or the cavity may not be filled with any material.

Figure 6:
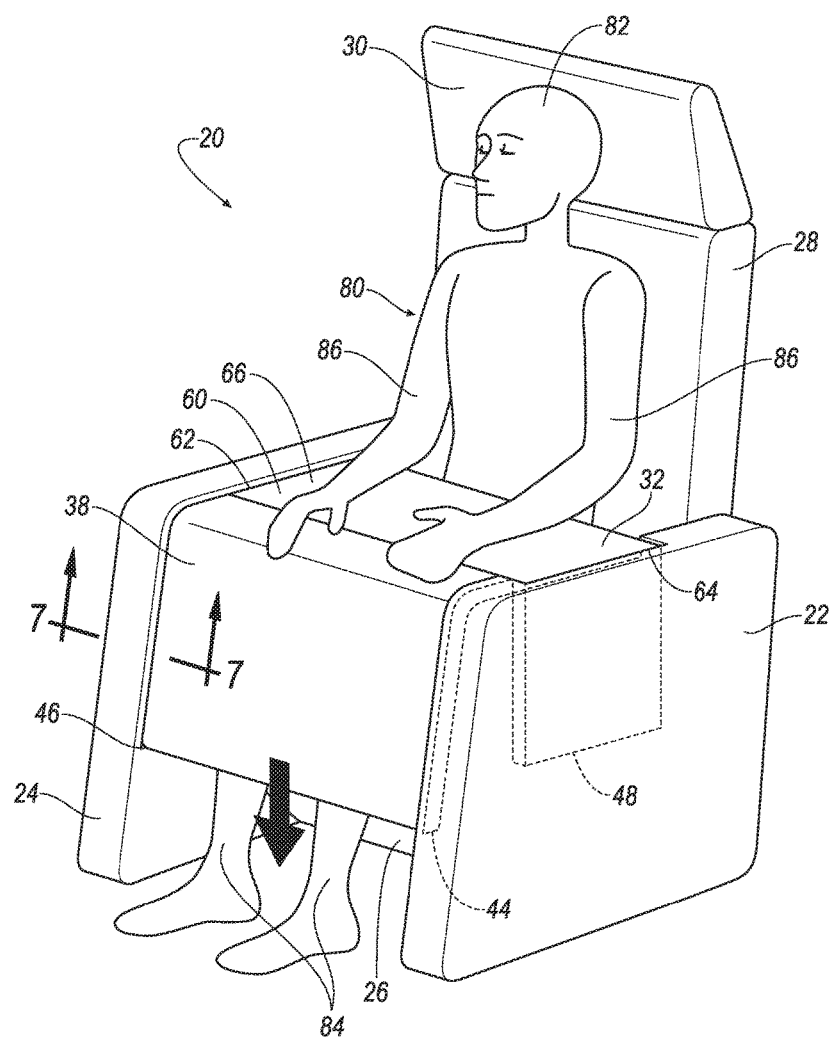
FIG. 6 is a perspective view of the seat assembly and a knee restraint in a deployed position.

With reference to FIGS. 5-9, the seat assembly 20 may include a knee restraint 38 supported by the bridge 32. The knee restraint 38 may be deployable to a deployed position, as shown in FIG. 6. The knee restraint 38 in the deployed position may be in front of the seat bottom 26. For example, the seat bottom 26 may include a front end 50, i.e., where legs 84 of the occupant 80 hang off, spaced from the seat back 28, and the seat bottom 26 is between the knee restraint 38 and the seat back 28 when the knee restraint 38 is in the deployed position. The knee restraint 38 may include an inflation chamber 92. As another example, the knee restraint 38 may be substantially solid. In such an example, the knee restraint 38 may include slats that unfold as the knee restraint 38 moves to the deployed position. The knee restraint 38 may be formed of any suitable material, such as, e.g., steel, aluminum, plastic, carbon fiber, a woven polymer, etc.

With continued reference to FIGS. 5-9, the knee restraint 38 may be rolled into the bridge 32 in an undeployed position. As shown in FIG. 5, the knee restraint 38 in the undeployed position may be housed in the cavity 56. As another example, the knee restraint 38 may be folded into the bridge 32 in the undeployed position. Alternatively, the knee restraint 38 may be supported by the bridge 32 in any suitable way.

Figure 7:
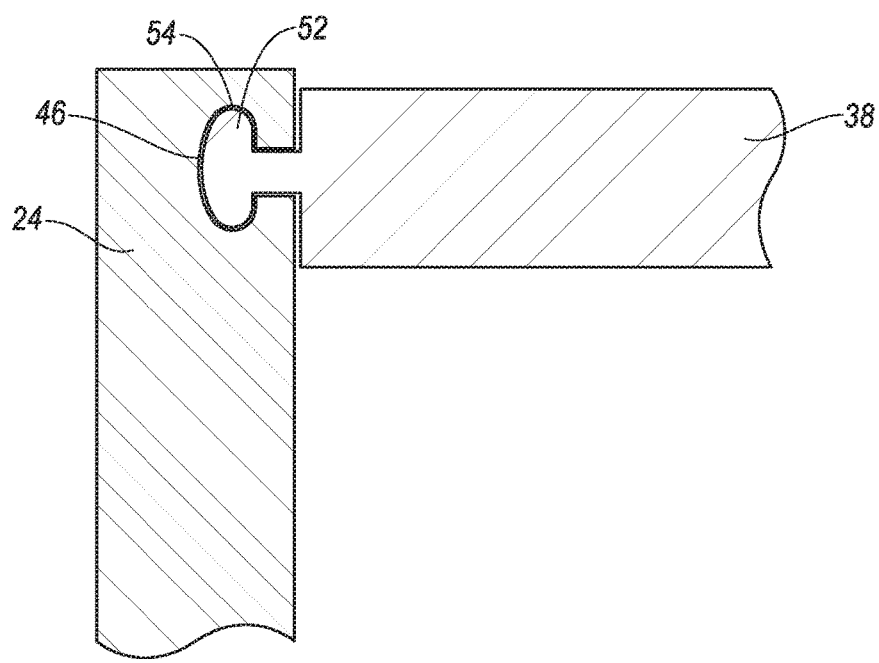
FIG. 7 is a cross-section view of a portion of the knee restraint and a second bolster.

The knee restraint 38 may be engageable with the first and second tracks 44, 46, and deployable along the first and second tracks 44, 46. For example, as shown in FIG. 7, the knee restraint may include an engagement member 52 and the second track 46 may include a second engagement member 54. The second engagement member 54 may be slightly larger than the engagement member 52, and the second engagement member 54 may be designed to receive the engagement member 52.

As shown in FIG. 7, the engagement member 52 may be a male engagement member and the second engagement member 54 may be a female engagement member designed to receive the engagement member 52. Alternatively, the second engagement member 54 may be a male engagement member and the engagement member 52 may be a female engagement member designed to receive the second engagement member 54. The engagement between the knee restraint 38 and the first track 44 may be substantially similar or identical to the aforementioned engagement between the knee restraint 38 and the second track 46. Alternatively, the engagement between the knee restraint 38 and the first track 44 may be different than the aforementioned engagement between the knee restraint 38 and the second track 46.

Figure 9:
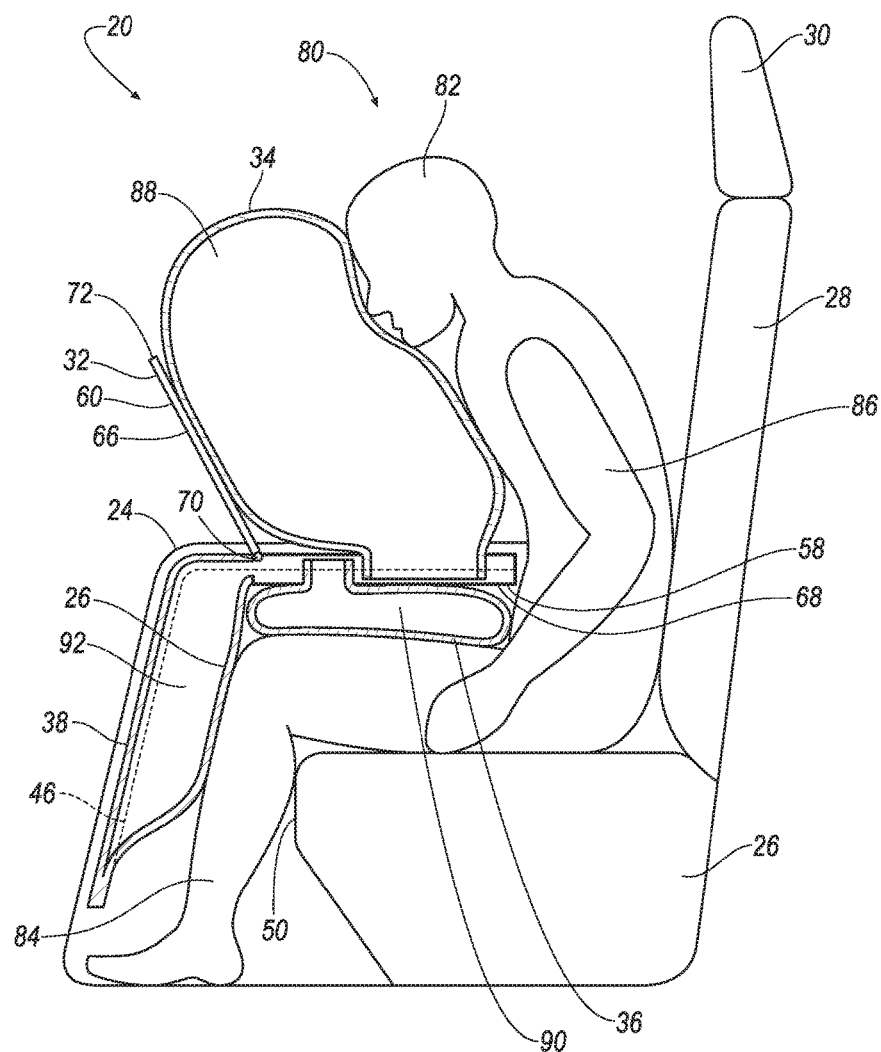
FIG. 9 is a cross-section view of a portion of FIG. 8.

With reference to FIGS. 5, 8, and 9, the inflatable device 34 may be supported by the bridge 32. The inflatable device 34 may be inflatable from an uninflated position, as shown in FIGS. 1-6, to an inflated position, as shown in FIGS. 8 and 9. The inflatable device 34 in the uninflated position may be housed in the cavity 56, as shown in FIG. 5. The inflatable device 34 may be inflatable from the bridge 32 in a direction away from the seat bottom 26. For example, the inflatable device 34 may inflate in a direction generally toward the seat back 28 and/or the head restraint 30. The inflatable device 34 may include an inflation chamber 88.

The bridge 32 may be rigid relative to the inflatable device 34. For example, the inflatable device 34 may be more flexible than the bridge 32, i.e., the bridge 32 may be substantially inflexible and the inflatable device 34 may be more flexible than the bridge 32. The bridge 32 may be formed of any suitable material, such as, e.g., steel, aluminum, plastic, carbon fiber, a woven polymer, etc.

With reference to FIGS. 5 and 9, the seat assembly 20 may include a second inflatable device 36 supported by the bridge 32. The second inflatable device 36 may be inflatable from an uninflated position to an inflated position. In the uninflated position, the second inflatable device 36 may be housed in the cavity 56. The second inflatable device 36 may be inflatable toward the seat bottom 26, e.g., toward the legs 84 of the occupant 80. The second inflatable device 36 may include an inflation chamber 90.

The inflatable device 34 and the second inflatable device 36 may be formed of a woven polymer or any other material.

As one example, the inflatable device 34 and the second inflatable device 36 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The inflatable device 34 and the second inflatable device 36 may be formed of the same material or different materials.

As another example, the vehicle 40 may include a seat belt system (not shown) that operates conjunctively with, separately from, complementary to, or supplementary to the seat assembly 20. The vehicle 40 may include a variety of airbags (not shown) that operate conjunctively with, separately from, complementary to, or supplementary to the seat assembly 20.

In light of the foregoing, the operation of the seat assembly 20 will now be described. The vehicle 40 may prohibit the occupant from setting the vehicle 40 to drive mode until the bridge 32 is in the deployed position. Alternatively, the bridge 32 may move to the deployed position upon the vehicle 40 sensing an impending vehicle impact, through sensors, such as, for example, radar sensors, scanning laser range finders, light detection and ranging (LIDAR) devices, and image processing sensors such as cameras.

Upon sensing an impending vehicle impact, before setting the vehicle 40 to drive mode, or at any suitable time, the bridge 32 may be deployed. During a deployment of the bridge 32 to the deployed position, the bridge 32 may be designed to be extracted from the slot 48 and moved toward the second bolster 24, as shown in FIGS. 2A-4. The bridge 32 may be extracted manually by the occupant 80, or the bridge 32 may extracted automatically from the slot 48 through, for example, motors, springs, etc. Similarly, the bridge 32 may be moved manually toward the second bolster 24 by the occupant 80, or the bridge 32 may be moved automatically toward the second bolster 24 through, for example, motors, springs, etc.

With reference to FIGS. 4-6, the knee restraint 38 may deploy in response to a sensed vehicle impact. During a deployment of the knee restraint 38, the knee restraint 38 may be designed to unroll to the deployed position, as shown in FIG. 6. For example, the knee restraint 38 may engage the first and second tracks 44, 46, and deploy along the first and second tracks 44, 46, i.e., the knee restraint 38 may generally follow the direction of the first and second tracks 44, 46 during the deployment of the knee restraint 38. The bridge 32 may include a tear seam, latch, etc., through which the knee restraint 38 may pass through during the deployment of the knee restraint 38.

With continued reference to FIGS. 4-6, during the deployment of the knee restraint 38, the knee restraint 38 may be designed to inflate to an inflated position. For example, an inflator (not shown) may fill the inflation chamber 92 of the knee restraint 38 with an inflatable medium, such as gas, and may cause the knee restraint 38 to deploy along the first and second tracks 44, 46.

With reference to FIGS. 8 and 9, before, after, or concurrently with the deployment of the knee restraint 38, the inflatable device 34 and/or the second inflatable device 36 may inflate to the inflated position(s). The inflatable device 34 and/or the second inflatable device 36 may inflate to the inflated position(s) upon the vehicle 40 sensing an impending vehicle impact, through sensors, such as, for example, radar sensors, scanning laser range finders, light detection and ranging (LIDAR) devices, and image processing sensors such as cameras. At least one inflator (not shown) may fill the inflation chambers 88, 90 with an inflatable medium, such as gas.

With continued reference to FIGS. 8 and 9, during an inflation of the inflatable device 34, the lid 60 may be designed to rotate and stop at a predetermined location and the inflatable device 34 in the inflated position abuts the lid 60 at the predetermined location. For example, the inflation of the inflatable device 34 may exert a force on the lid 60, and may cause the second end 72 of the lid 60 to detach from the base 58. Then, the lid 60 may rotate around the first end 70 and stop at the predetermined location. The lid 60 may be stopped at the predetermined location by, for example, a stopper, a hinge design, or any suitable mechanism. At the predetermined location, the inflatable device 34 may exert a force on an underside of the lid 60, and the lid 60 may exert an opposite force on the inflatable device 34 through the stopper or other suitable mechanism.

Before, after, or concurrently with the deployment of the knee restraint 38 and the inflation of the inflatable device 34, the second inflatable device 36 may inflate to the inflated position. The bridge 32 may include a tear seam, latch, etc., through which the second inflatable device 36 may pass through during the inflation of the second inflatable device 36.

During a vehicle impact, as shown in FIGS. 8 and 9, the inflatable device 34 may receive and restraint a head 82 of the occupant 80, the second inflatable device 36 may receive and restrain the top of the legs 84, i.e., thighs, of the occupant 80, and the knee restraint 38 may receive and restrain the front of the legs 84, i.e., knees and shins, of the occupant 80.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly comprising:
   a first bolster and a second bolster spaced from each other;
   a seat bottom between the first and second bolster;
   a bridge deployable to a deployed position, the bridge in the deployed position being spaced from the seat bottom, the bridge in the deployed position being supported on the first and second bolsters and extending from the first bolster to the second bolster;
   an inflatable device supported by the bridge; and
   wherein the bridge has a first end and a second end spaced from the first end, the first end including a locking mechanism and the second end including a rotating mechanism.

2. The seat assembly of claim 1, wherein the bridge is rotatable relative to the first bolster between an undeployed position and the deployed position and, in the deployed position, the bridge is releasably locked to the second bolster.

3. The seat assembly of claim 2, wherein the first bolster includes a slot, and the bridge in the undeployed position is stowed in the slot.

4. The seat assembly of claim 3, wherein during a deployment of the bridge to the deployed position, the bridge is designed to be extracted from the slot and moved toward the second bolster.

5. The seat assembly of claim 1, wherein the inflatable device is inflatable from the bridge in a direction away from the seat bottom.

6. The seat assembly of claim 1, further comprising a second inflatable device supported by the bridge, the second inflatable device being inflatable toward the seat bottom.

7. The seat assembly of claim 1, further comprising a knee restraint supported by the bridge, the knee restraint being deployable to a deployed position, the knee restraint in the deployed position being in front of the seat bottom.

8. The seat assembly of claim 7, wherein the knee restraint is rolled into the bridge, and during a deployment of the knee restraint, the knee restraint is designed to unroll to the deployed position.

9. The seat assembly of claim 7, wherein during a deployment of the knee restraint, the knee restraint is designed to inflate to an inflated position.

10. The seat assembly of claim 1, wherein the first bolster includes a first track and the second bolster includes a second track, the first track and the second track facing each other.

11. The seat assembly of claim 10, wherein the bridge is engageable with the first and second tracks and lockable with the second track.

12. The seat assembly of claim 10, further comprising a knee restraint supported by the bridge, the knee restraint being engageable with the first and second tracks and deployable along the first and second tracks.

13. The seat assembly of claim 1, wherein the bridge includes a cavity, and the inflatable device in an uninflated position is housed in the cavity.

14. The seat assembly of claim 13, further comprising a second inflatable device and a knee restraint, the second inflatable device and the knee restraint being housed in the cavity.

15. The seat assembly of claim 1, wherein the seat bottom extends from the first bolster to the second bolster.

16. The seat assembly of claim 1, wherein the bridge includes a base and a lid having a first end rotatably attached to the base and a second end removably attached to the base.

17. The seat assembly of claim 16, wherein during an inflation of the inflatable device, the lid is designed to rotate and stop at a predetermined location and the inflatable device in an inflated position abuts the lid at the predetermined location.

18. The seat assembly of claim 1, further comprising a seat back supported by the seat bottom, wherein the bridge in the deployed position is spaced from the seat back.

19. The seat assembly of claim 1, wherein the bridge is rigid relative to the inflatable device.

20. A seat assembly comprising:
a first bolster and a second bolster spaced from each other;
a seat bottom between the first and second bolster;
a bridge deployable to a deployed position, the bridge in the deployed position being spaced from the seat bottom, the bridge in the deployed position being supported on the first and second bolsters and extending from the first bolster to the second bolster;
an inflatable device supported by the bridge; and
a second inflatable device supported by the bridge, the second inflatable device being inflatable toward the seat bottom.

21. A seat assembly comprising:
a first bolster and a second bolster spaced from each other;
a seat bottom between the first and second bolster;
a bridge deployable to a deployed position, the bridge in the deployed position being spaced from the seat bottom, the bridge in the deployed position being supported on the first and second bolsters and extending from the first bolster to the second bolster;
an inflatable device supported by the bridge; and
a knee restraint supported by the bridge, the knee restraint being deployable to a deployed position, the knee restraint in the deployed position being in front of the seat bottom.

* * * * *